(12) United States Patent
Noh

(10) Patent No.: US 7,995,120 B2
(45) Date of Patent: Aug. 9, 2011

(54) IMAGE BRIGHTNESS COMPENSATING APPARATUS AND METHOD, RECORDED MEDIUM RECORDED THE PROGRAM PERFORMING IT

(75) Inventor: Yo-Hwan Noh, Gyeonggi-do (KR)

(73) Assignee: Mtekvision Co., Ltd., Seoul (KR)

( * ) Notice: Subject to any disclaimer, the term of this patent is extended or adjusted under 35 U.S.C. 154(b) by 411 days.

(21) Appl. No.: 12/307,094

(22) PCT Filed: Aug. 22, 2007

(86) PCT No.: PCT/KR2007/004002
§ 371 (c)(1),
(2), (4) Date: Dec. 30, 2008

(87) PCT Pub. No.: WO2008/026847
PCT Pub. Date: Mar. 6, 2008

(65) Prior Publication Data
US 2009/0303353 A1    Dec. 10, 2009

(30) Foreign Application Priority Data

Aug. 28, 2006 (KR) .......................... 10-2006-0081687

(51) Int. Cl.
H04N 9/68 (2006.01)
H04N 5/235 (2006.01)
H04N 5/232 (2006.01)
H04N 5/202 (2006.01)
H04N 5/57 (2006.01)
G06K 9/40 (2006.01)

(52) U.S. Cl. ..................... 348/234; 348/221.1; 348/365; 348/254; 348/229.1; 348/603; 382/274; 382/264

(58) Field of Classification Search .................. 348/234, 348/254, 353, 362–370, 671, 221.1, 222.1, 348/229.1, 227.1, 225.1, 603, 673, 687; 382/274, 382/237, 169, 264
See application file for complete search history.

(56) References Cited

U.S. PATENT DOCUMENTS 7,230,644 B2 * 6/2007 Nakamura et al. ............ 348/254
(Continued)

FOREIGN PATENT DOCUMENTS

KR   10-2006-0016648 A    2/2006

*Primary Examiner* — Lin Ye
*Assistant Examiner* — Marly Camargo
(74) *Attorney, Agent, or Firm* — Birch, Stewart, Kolasch & Birch, LLP (57) ABSTRACT

An apparatus and a method of smoothing the brightness of an image photographed in an image sensor without amplifying a noise component of a surrounding part of the image are disclosed. The image brightness correction apparatus correcting the brightness of an image by using a correction curve can include an image input unit, receiving an image; a correction gradient selection unit, selecting a gradient of the correction curve corresponding to an object pixel, having the brightness desired to be corrected, of pixels of the image; a correction performance unit, converting original brightness of the object pixel into correction brightness according to the correction curve having the selected gradient; and an image output unit, outputting the image allowing the object pixel to have the correction brightness by the correction performance unit; whereas the correction curve increases the contrast of the corresponding correction brightness if the original brightness is the same as or smaller than a predetermined brightness, and the correction curve decreases the contrast of the corresponding correction brightness if the original brightness is larger than a predetermined brightness. With the present invention, a dynamic range of an image is smooth and the contrast of the image is acquired.

14 Claims, 8 Drawing Sheets

U.S. PATENT DOCUMENTS

| | | | |
|---|---|---|---|
| 7,570,390 B2 * | 8/2009 | Mitsunaga | 358/1.9 |
| 7,639,292 B2 * | 12/2009 | Kwon et al. | 348/243 |
| 2005/0185071 A1 * | 8/2005 | Takahashi et al. | 348/254 |
| 2005/0226526 A1 | 10/2005 | Mitsunaga | |
| 2005/0285952 A1 | 12/2005 | Kwon et al. | |

* cited by examiner

IMAGE BRIGHTNESS COMPENSATING APPARATUS AND METHOD, RECORDED MEDIUM RECORDED THE PROGRAM PERFORMING IT

CROSS-REFERENCE TO RELATED APPLICATIONS

This application claims foreign priority benefits under 35 U.S.C. sctn. 119(a)-(d) to PCT/KR2007/004002, filed Aug. 22, 2007, which is hereby incorporated by reference in its entirety.

BACKGROUND

1. Technical Field

The present invention relates to an image sensor, more specifically, an apparatus and a method of smoothing the brightness of an image photographed by an image sensor without amplifying a noise component of a surrounding part of the image.

2. Description of the Related Art

An image sensor refers to the semiconductor device converting an optical image into an electric signal. Among this, a charge coupled device (CCD) refers to the device in which individual metal-oxide-silicon (MOS) capacitors are placed very close to each other and charge carriers are stored in and transmitted to the capacitors. However, a complementary MOS (CMOS) image sensor refers to the device employing a switching method, which makes as many MOS transistors as the number of pixels by using the CMOS technology using a control circuit and a signal processing circuit as a peripheral circuit and successively detects the output of the pixels by using the MOS transistors.

Portable apparatuses (e.g. digital cameras and mobile communication terminal) having image sensors are now developed and on sale. The image sensor consists of the arrays of small photo diodes, which are called pixel or photosite. The pixels themselves typically do not extract color from light. The pixels merely convert photos, provided from a wide spectrum band, into electrons. To write a color image by using a single sensor, a sensor is filtered such that different pixels can receive different color light. This type of sensor is well-known as a color filter array (CFA). The different color filters intersect the sensor and are arrayed in a predetermined pattern.

A color filter array of a color image typically is typically adjusted to the Bayer pattern. In other words, the half of total numbers of pixels is assigned to green G. Each quarter of the total numbers is assigned to red R and blue B. To get color information, color image pixels has a pattern repeated with red, green, and blue filters. For example, the Bayer pattern has a 2×2 array.

The Bayer pattern is based on the premise that a user's eye derives most of luminance data from the green component of an image. Accordingly, the RGB color filter alternated with more green pixels than other color pixels can generate a higher contrast image than the RGB color filter alternated with the same ratio of red, green and blue pixels.

The first one of elements directly related to the image quality of the image sensor is the lens concentrating light on the image sensor. The lens is required to have the properties such as good concentration of the focus point of light on the image sensor, penetration of more amount of light and uniform permeability of light into whole photographing surface. A recently developed and purchased portable apparatus has the trends toward slim appearance and miniaturization, which mean all sensor modules become slim and compact. Accordingly, a corresponding image sensor equipped in the portable apparatus is required to have high resolution. As a result, enough distance is not acquired between a lens and a photographed surface. The brightness of the lens is not bright enough. The permeability of the lens is not uniform. In particular, the more distant the lens is toward an outside, the less the amount of light becomes.

Figure 1:
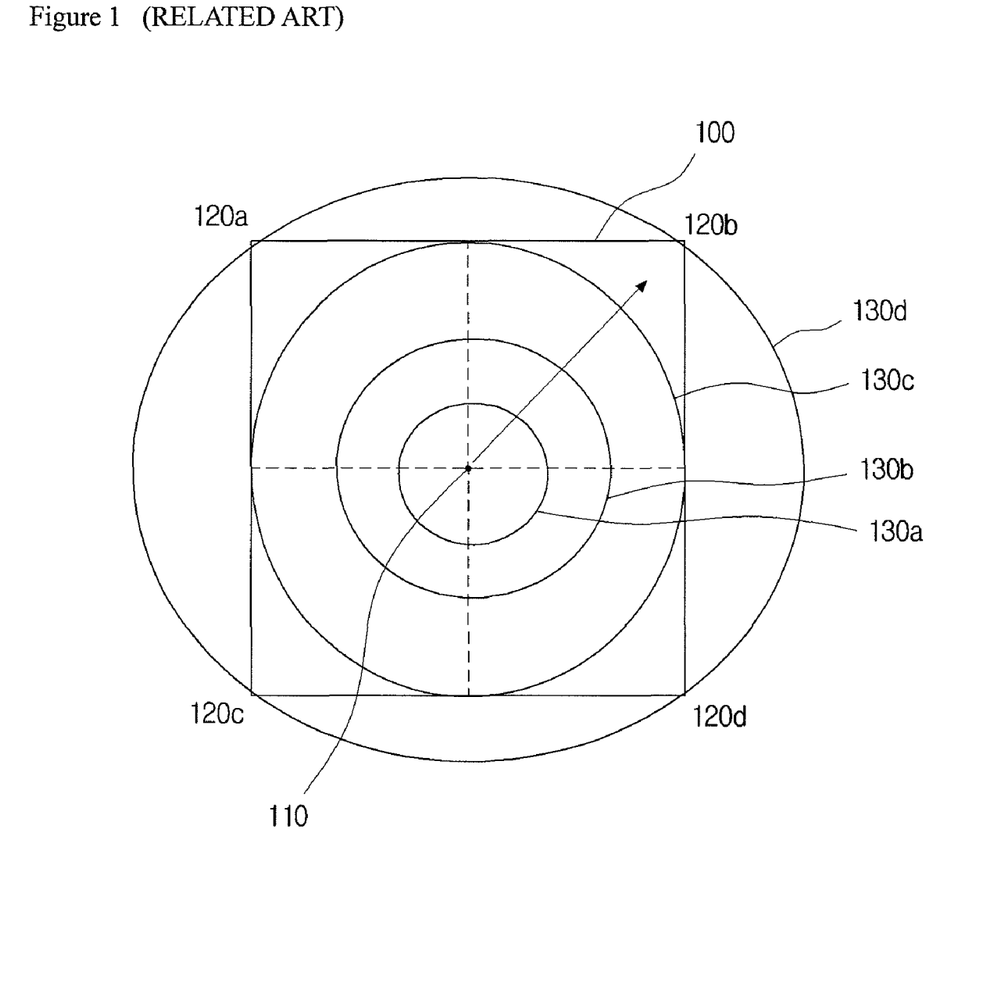
FIG. 1 illustrates an image of an image sensor and an area thereof having different features.
Figure 2:
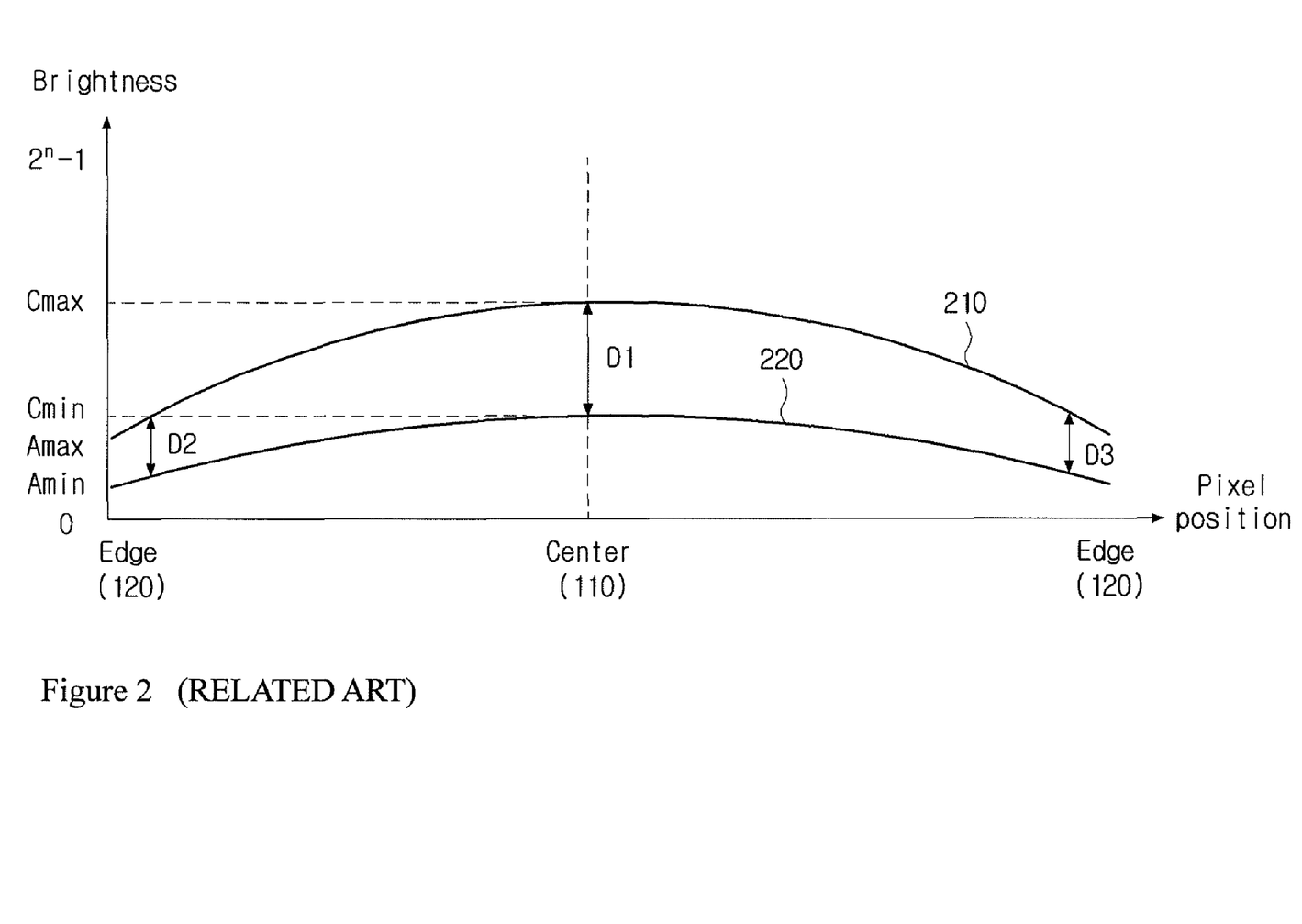
FIG. 2 illustrates features of an image per area.
Figure 3:
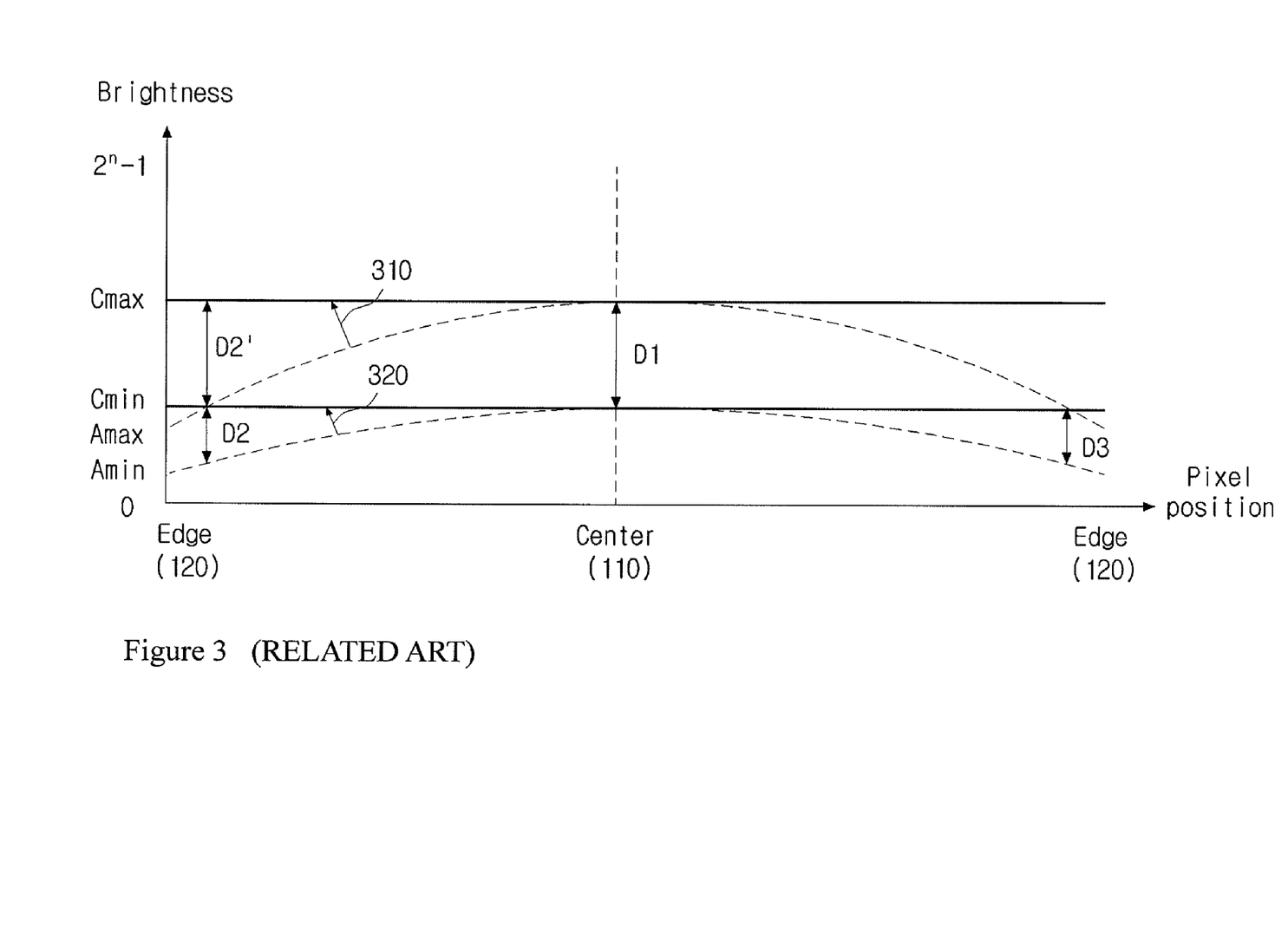
FIG. 3 illustrates a method of compensating features of an image per area.

FIG. 1 illustrates an image of an image sensor and an area thereof having different features, FIG. 2 illustrates features of an image per area and FIG. 3 illustrates a method of compensating features of an image per area.

Referring to FIG. 1, the feature of the image 100 is typically changed in the direction from a center pixel 110 of a center part thereof toward each edge pixel 120a, 120b, 120c and 120d (hereinafter, collectively referred to as 120). In other words, portions having similar features can be recognized by each concentric ring 130a, 130b, 130c and 130d.

FIG. 2 shows the brightness, depending on the position of a pixel in the image 100, of various features. A first curve 210 indicates the maximum brightness depending on each pixel, and a second curve 220 indicates the minimum brightness depending on each pixel. The first curve 210 and the second curve 220 are brightest in the center pixel 110 and darkest in the edge pixel 120. The brightness of pixels get lower as the pixel position is changed from the center pixel to the edge pixel.

If a dynamic range D1 of the center pixel 110 is compared with dynamic ranges D1 and D2 of the edge pixels 120, the dynamic range D1 of the center pixel 110 is wider. Here, the dynamic range refers to the difference between the darkest brightness and the brightest brightness capable of being expressed in a corresponding pixel. In other words, the wide dynamic range leads to the high contrast, and the narrow dynamic range leads the low contrast.

If the dynamic range D1 of the center pixel 110 is compared with dynamic ranges D1 and D2 of the edge pixels 120, the difference occurs from 30 to 40% at the maximum depending on the lens feature of the image sensor. When it comes to the brightness, the surrounding parts having the edge parts 120 are easily affected by the noise relatively as compared with the center part having the center pixel 110. Accordingly, the compensation is needed.

For the compensation, referring to FIG. 3, the dynamic ranges of the whole image are attempted to be smoothed based on the dynamic range of the center pixel 110 (referring to a first arrow 310 and a second arrow 320). Accordingly, the dynamic range D2 of the surrounding part (having the edge pixel 120) is changed into D2'. For this, a gain of a certain rate is multiplied or a device performing a lens shading compensation function is used in order to compensate the dynamic ranges of the whole image. However, in this case, the noise component is amplified together in the surrounding part having the edge pixel 120, to thereby lower the contrast in the surrounding parts of the image 100 and deteriorate the quality of the image 100.

SUMMARY

Accordingly, the present invention provides an image brightness correction apparatus and a method thereof, and a recoding medium recorded with a program performing the method that can smooth the brightness of a whole image without amplifying a noise component of a surrounding part of the image.

To solve the above problems, according to an aspect of the present invention, there can be provided an apparatus correcting the brightness of an image by using a correction curve, including an image input unit, receiving an image; a correction gradient selection unit, selecting a gradient of the correction curve corresponding to an object pixel, having the brightness desired to be corrected, of pixels of the image, a correction performance unit, converting original brightness of the object pixel into correction brightness according to the correction curve having the selected gradient; and an image output unit, outputting the image allowing the object pixel to have the correction brightness by the correction performance unit; whereas the correction curve increases the contrast of the corresponding correction brightness if the original brightness is the same as or smaller than a predetermined brightness, and the correction curve decreases the contrast of the corresponding correction brightness if the original brightness is larger than a predetermined brightness.

Preferably, the correction gradient selection unit can select the gradient to increase the contrast of the corresponding brightness according to the position relationship between a center pixel of the image and the object pixel if the original brightness is the same as or smaller than the predetermined brightness.

Also, the correction curve can be the same as or larger than 1 if the original brightness is the same as or smaller than the predetermined brightness and is smaller than 1 if the original brightness is larger than the predetermined brightness.

The correction curve can be represented in a form of a lookup table for the relationship between the original brightness and the correction brightness.

In the correction curve, the correction brightness can be the same as or larger than a predetermined value.

The correction gradient selection unit can allow the correction curve to have different gradients whenever the distance between the center pixel and the object pixel of the image is integer numbers times as many as predetermined pixel numbers.

To solve the above problems, according to another aspect of the present invention, there can be provided a method correcting the brightness of an image by using a correction curve, including (a) receiving an image; (b) selecting an object pixel, having the brightness desired to be corrected, of pixels of the image; (c) selecting a gradient of the correction curve corresponding to the object pixel; (d) converting original brightness of the object pixel into correction brightness according to the correction curve having the selected gradient; and (e) outputting the image allowing the object pixel to have the correction brightness, whereas the correction curve increases the contrast of the corresponding correction brightness if the original brightness is the same as or smaller than a predetermined brightness, and the correction curve decreases the contrast of the corresponding correction brightness if the original brightness is larger than a predetermined brightness.

Preferably, the step (c) can select the gradient to increase the contrast of the corresponding brightness according to the position relationship between a center pixel of the image and the object pixel if the original brightness is the same as or smaller than the predetermined brightness.

Further, the correction curve can be the same as or larger than 1 if the original brightness is the same as or smaller than the predetermined brightness and can be smaller than 1 if the original brightness is larger than the predetermined brightness.

The method can further include repeating the steps (b) through (d) until all pixels of the image are selected as the object pixel before the step (e).

The correction curve can be represented in a form of a lookup table for the relationship between the original brightness and the correction brightness.

In the correction curve, the correction brightness can be the same as or larger than a predetermined value.

The step (b) can allow the correction curve to have different gradients whenever the distance between the center pixel and the object pixel of the image is integer numbers times as many as predetermined pixel numbers.

To solve the above problems, according to another aspect of the present invention, there can be provided a recording medium tangibly embodying a program of instructions executable by a digital processing apparatus to correct the brightness of an image, the recording medium being readable by the digital processing apparatus, the program including (a) receiving an image; (b) selecting an object pixel, having the brightness desired to be corrected, of pixels of the image; (e) selecting a gradient of the correction curve corresponding to the object pixel; (d) converting original brightness of the object pixel into correction brightness according to the correction curve having the selected gradient; and (e) outputting the image allowing the object pixel to have the correction brightness, whereas the correction curve increases the contrast of the corresponding correction brightness if the original brightness is the same as or smaller than a predetermined brightness, and the correction curve decreases the contrast of the corresponding correction brightness if the original brightness is larger than a predetermined brightness.

Other problems, certain benefits and new features of the present invention will become more apparent through the following description with reference to the accompanying drawings and some embodiments.

DETAILED DESCRIPTION

Hereinafter, some embodiments of an image brightness correction apparatus and a method thereof and a recoding medium recorded with a program performing the method in accordance with the present invention will be described in detail with reference to the accompanying drawings. Throughout the description of the present invention, when describing a certain technology is determined to evade the point of the present invention, the pertinent detailed description will be omitted. Terms (e.g. "first" and "second") used in this description merely are identification for successively identifying identical or similar elements.

Figure 4:
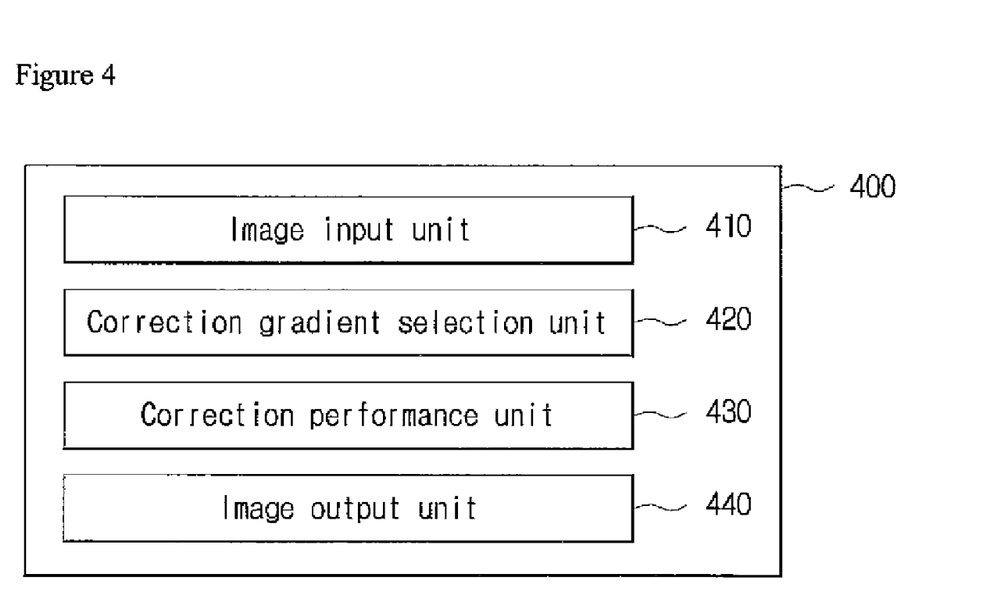
FIG. 4 is a block diagram briefly illustrating an image brightness correction apparatus in accordance with an embodiment of the present invention.
Figure 5:
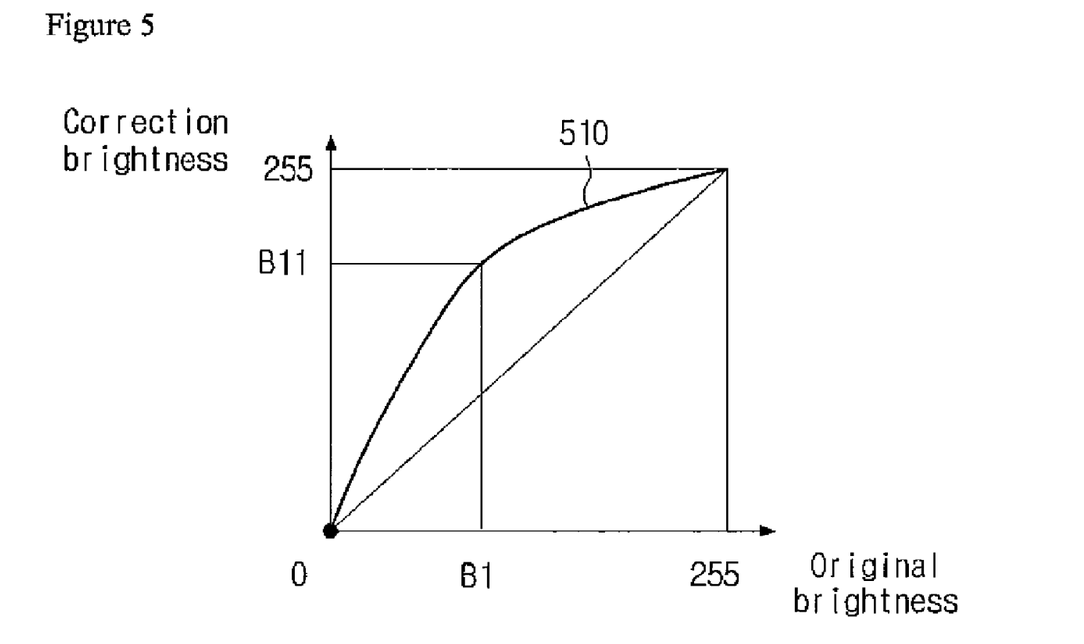
FIG. 5 illustrates an example of a correction curve in accordance with an embodiment of the present invention.

FIG. 4 is a block diagram briefly illustrating an image brightness correction apparatus in accordance with an embodiment of the present invention, and FIG. 5 illustrates an example of a correction curve in accordance with an embodiment of the present invention.

The image brightness correction apparatus 400 includes an image input unit 410, a correction gradient selection unit 420, a correction performance unit 430 and an image output unit 440.

The image input unit 410 receives an image having a brightness desired to be corrected. The image is assumed to have the same property as illuminated in FIG. 1. In other words, a surrounding part of an image is darker than a center part by the lens property of the image sensor.

The correction gradient selection unit 420 selects an object pixel, having a brightness desired to be corrected, of each pixel of the image inputted into the image input unit 410. Also, the correction gradient selection unit 420 selects a gradient of a correction curve for correcting the brightness of the selected object pixel. The correction curve is predetermined, and the gradient of the correction curve is changed according to the object pixel.

Alternatively, a different correction curve can be selected according to the selected object pixel. A plurality of correction curves can be predetermined, and any one of the plurality of correction curves can be selected according to the objected pixel.

The correction curve has information related to correction brightness corresponding to the original brightness of the object pixel. For example, in the case of having a contrast of n bits, n being a natural number, the original brightness has a value between 0 and $2^n-1$. The correction brightness also has the contrast of n bits and a value between 0 and $2^n-1$. In this case, the correction curve allows the original brightness having a certain value to correspond with the correction brightness having the same or different value.

While a person's eye can typically distinguish minute difference in a dark area, the person's eye is not able to distinguish minute difference in a bright area. Accordingly, in order to increase the contrast of an image, a dark area of the original brightness is wider than that of the correction brightness. A bright area of the original brightness is narrower than that of the correction brightness.

Referring to FIG. 5, an image is assumed to have the contrast of 8 bits. If the original brightness has a value between 0 and B1, since the correction brightness by a correction curve 510 has a value between 0 and B11 and B11 is larger than B1, a dark area of the original brightness is wider than that of the correction brightness. Also, in this area, the gradient of the correction curve is the same as or larger than 1. This means that it becomes easier to distinguish the difference in the area where the correction brightness of the image is darker than the original brightness. If the original brightness is the same as or smaller than B1, the corresponding correction brightness is the same as or smaller than B11. Since B1 is the same as or smaller than B11, the contrast (i.e. the difference between the maximum value and the minimum value=B11) of the correction brightness is higher than the contrast (i.e. the difference between the maximum value and the minimum value=B1) of the original brightness.

If the original brightness has a value between B1 and 255, since the correction brightness by the correction curve 510 has a value between B11 and 255 and B11 is larger than B1, a bright area of the original brightness is narrower than that of the correction brightness. Also, in this area, the gradient of the correction curve 510 is smaller than 1. If the original brightness is the same as or larger than B11, the corresponding correction brightness is the same as or larger than B11. Since B1 is the same as or smaller than B11, the contrast (i.e. 255-B11) of the correction brightness is smaller than the contrast (i.e. 255-B1) of the original brightness. The correction curve 510 increases the contrast of the correction brightness (the gradient of the correction curve 510 is the same as or larger than 1) in case that the original brightness has the same as or smaller value than a predetermined brightness (e.g. B1 in the case of FIG. 5) and decreases the contrast of the correction brightness (the gradient of the correction curve 510 is smaller than 1) in case that the original brightness has a larger value than a predetermined brightness (e.g. B1 in the case of FIG. 5).

While one correction curve is used for the whole image, the gradient of the correction curve can be varied depending on an area where an object pixel is located in the image. Alternatively, various correction curves can be used depending on an area where an object pixel is located in the image. Since it is very likely that the surrounding part of the image is darker than the center part of the image, if the object pixel is located at the surrounding part of the image, the contrast of the dark area is increased more than the case that the object pixel is located at the center part of the image.

The correction performance unit 430 converts the original brightness of the object into corresponding correction brightness by using a correction curve having a gradient selected in the correction gradient selection unit 430.

The image output unit 440 outputs an image allowing the object pixel to have the correction brightness by the correction performance unit 430.

As one of good examples, before the image output unit 440 outputs the image having the corrected brightness, the object pixel is allowed to have the correction brightness instead of the original brightness by allowing the correction performance unit 430 to perform the correction according to the correction curve, selected by the correction gradient selection unit 420, for all pixels of the image.

Figure 6:
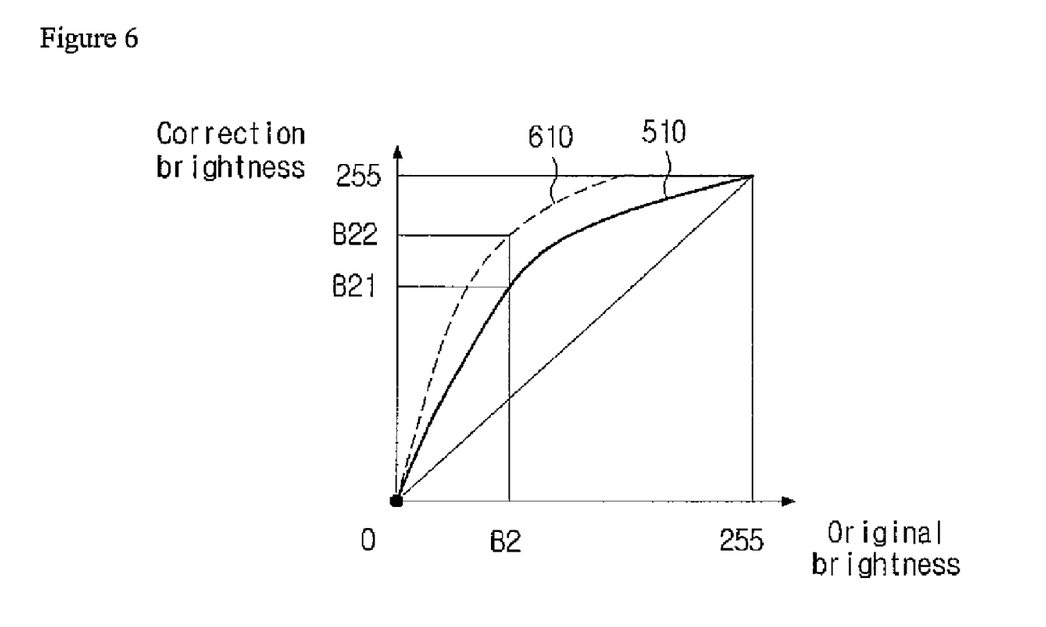
FIG. 6 illustrates an example of a correction curve changed according to the position of an object pixel in accordance with an embodiment of the present invention.

FIG. 6 illustrates an example of a correction curve changed according to the position of an object pixel in accordance with an embodiment of the present invention.

FIG. 6 illustrates a first correction curve 510 used in a center part of an image and a second correction curve 610 used in a surrounding part of the image, which have a similar type to a gamma curve typically used in the gamma correction. The second correction curve 610 can be generated by increasing the gradient of the first correction curve 510 more. In other words, since the correction brightness corresponding to the same original brightness B2 is B22 and B21 in the second correction curve 610 and the first correction curve 510, respectively, there occurs the difference between B22 and B21. This means that by allowing the second correction curve 610 to have a larger gradient than the first correction curve 510, it is possible to correct the second correction curve 610 so as to increase the contrast of the area, where the original brightness is dark, and thus to have a clearer image.

In other words, by changing the gradient of the correction curve according to the position relationship between a center pixel and an object pixel of the image, the brightness correction is differently performed in the center part and the surrounding part of the image, respectively. Since it is very likely that the surrounding part of the image is darker than the center part, the discrimination can be increased by allowing the area, where the original brightness is dark, to have the high contrast after correction.

As a shading curve for compensating lens shading goes toward edge parts based on a center pixel, the shading curve increasingly has a larger value. A recent portable apparatus has the trends toward slim appearance and miniaturization, which mean all sensor modules become slim and compact. Accordingly, a corresponding image sensor equipped in the portable apparatus is required to have the high resolution. As a result, enough distance is not acquired between a lens and a photographed surface. The brightness of the lens is not bright enough. The permeability of the lens is not uniform. In particular, there eminently appears a lens shading phenomenon, which the more distant the lens is toward an outside, the less the amount of light becomes. As it is getting more distant toward the outside based on the center pixel, it becomes dark due to reducing the amount of light. Accordingly, the shading curve has a convex shape toward the bottom showing that a compensation value becomes increasing as it is getting close to the edge part in order to suitably compensate the brightness of the whole image.

Thus, the gradient of the correction curve can be adjusted according to the same type of shading curve. Since the shading curve functions to compensate the brightness of pixels, it can be inferred that the larger a compensation value of the shading curve, the larger gain is multiplied to compensate the brightness of pixels. Accordingly, in accordance with another embodiment of the present invention, selecting the gradient of the correction curve according to the position of the object pixel is performed corresponding to the shading curve.

Figure 7:
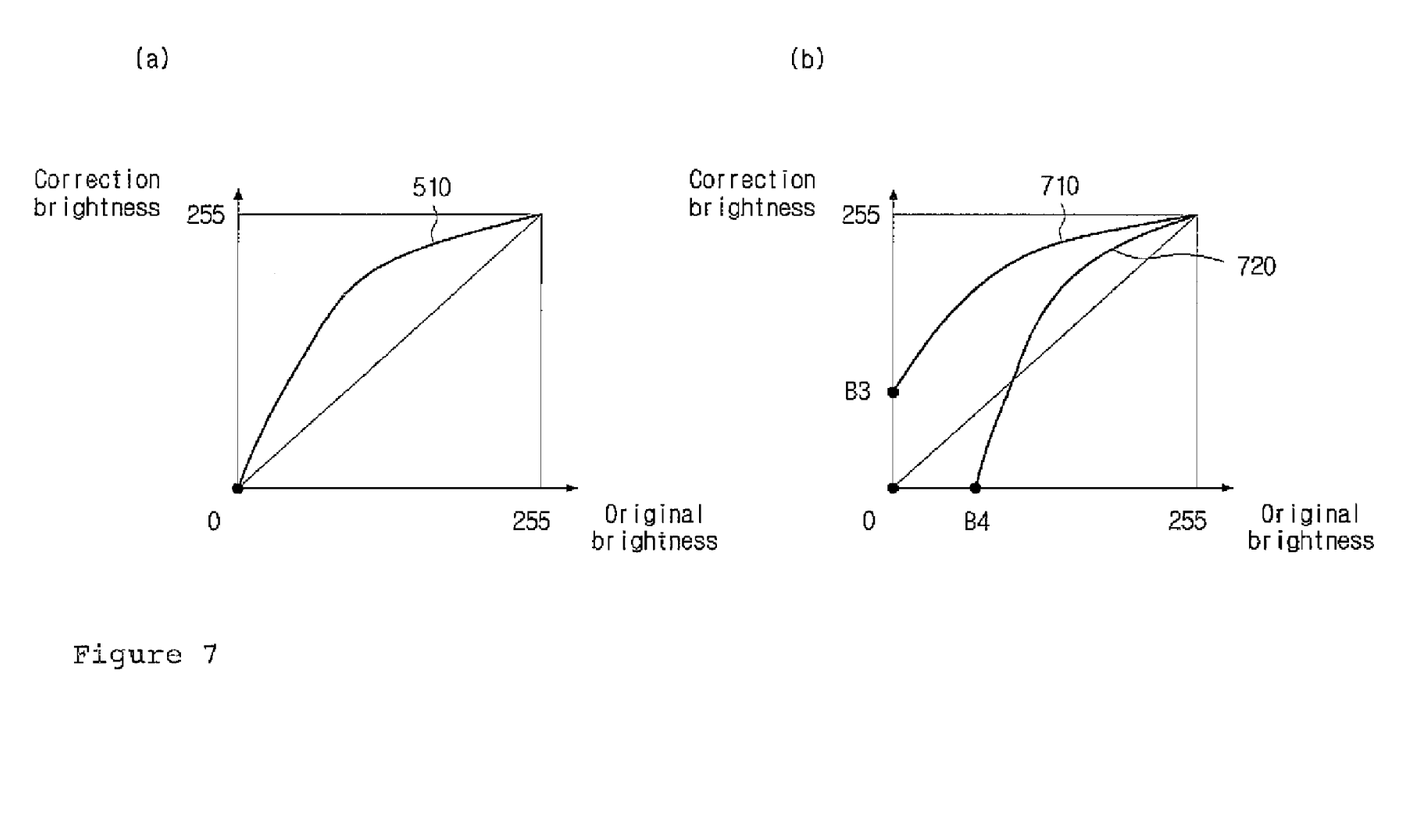
FIG. 7 illustrates an example of a correction curve changed according to the position of an object pixel in accordance with another embodiment of the present invention.

FIG. 7 illustrates an example of a correction curve changed according to the position of an object pixel in accordance with another embodiment of the present invention.

FIG. 7 (a) illustrates a first correction curve 510 used in a center part of an image, which has a similar type to a gamma curve typically used in the gamma correction.

FIG. 7 (b) illustrates a third correction curve 710 and a fourth correction curve 720 used in the surrounding part of the image. In the case of the third correction curve 710, the correction brightness of the object pixel is the same as or larger than a predetermined value (e.g. B3 in this case). In the case of the fourth correction curve 720, when the original brightness of the object brightness is the same as or smaller than a predetermined value (e.g. B4 in this case), the correction brightness is set as 0.

In accordance with another embodiment of the present invention, in the case of the third correction curve 710, the same effect as if an offset placed in the correction brightness is removed after correcting the original brightness is taken. In other words, the correction brightness by the third correction curve 710 is allowed to have a value which is the same as or larger than B3 in a lump by applying a certain rate to the correction brightness after the correction is performed by the first correction curve 510.

In accordance with another embodiment of the present invention, in the case of the fourth correction curve 720, the same effect as if the correction is performed after removing an offset placed in the original brightness is taken. In other words, the original brightness by the third correction curve 710 is allowed to have a value which is the same as or larger than B4 in a lump or by applying a certain rate to the original brightness before the correction is performed by applying the first correction curve 510.

By using the same curve as the correction curves 710 and 720, it is possible to differentiate brightness correction levels in the center part and the surrounding part of the image and to correct the phenomenon that the surrounding part of the image is likely to be darker than the center part, without amplifying noise.

In accordance with another embodiment of the present invention, the correction curve can be represented in a form of a lookup table. This means that the correction brightness corresponding to the original brightness at regular intervals is stored as the lookup table and it is possible to determine the correction brightness by an interpolation method for the original brightness therebetween.

Alternatively, the correction curve of the present invention can have different gradients or different correction curves can be selected whenever the distance between the center pixel and the object pixel of the image is integer numbers times as many as predetermined pixel numbers (e.g. 16 pixels and 32 pixels). This makes an operation speed more quickly and the load of a processor less in the correction operation as compared with the case of setting different gradients or different correction curves for all pixels of the image.

Figure 8:
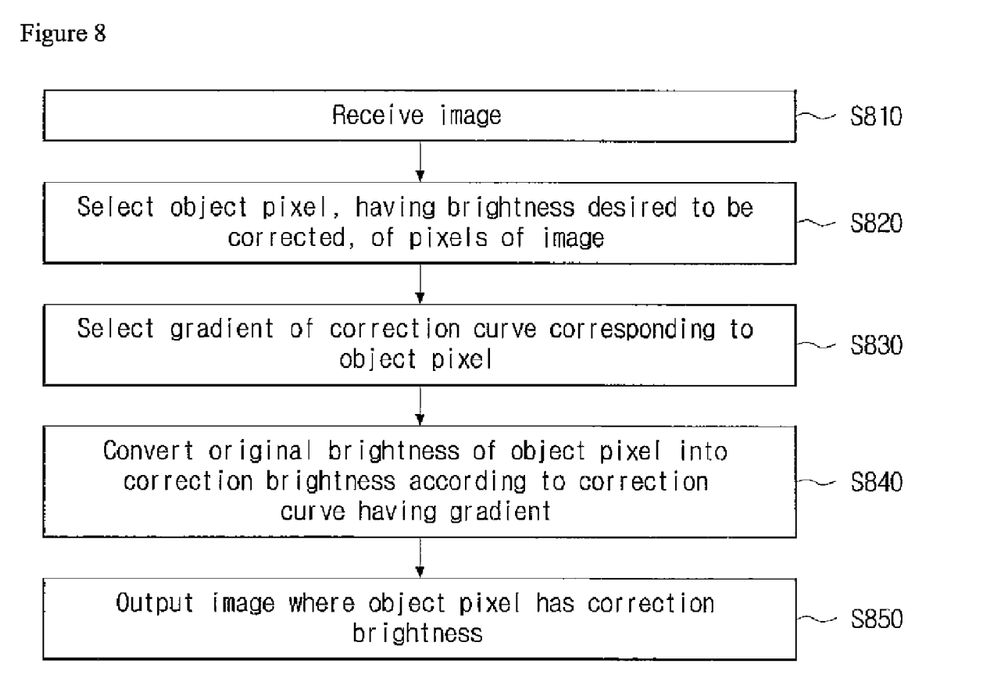
FIG. 8 is a flow chart illustrating an image brightness correction method in accordance with an embodiment of the present invention.

FIG. 8 is a flow chart illustrating an image brightness correction method in accordance with an embodiment of the present invention.

A step represented by S810 receives an image of the brightness desired to be corrected.

A step represented by S820 selects an object pixel, having the brightness desired to be corrected, of pixels of the inputted image. The selection of the object pixel is to select the gradient of the same or different correction curve for correction according to the position relationship between the center pixel and the object pixel of the image.

A step represented by S830 allows the correction curve to have the gradient corresponding to the object pixel. Since the correction curve has been described in detail with reference to FIG. 5 through FIG. 7, the pertinent description will be omitted.

A step represented by S840 converts original brightness of the object pixel into correction brightness according to the correction curve having the selected gradient. Here, the correction curve can be represented in a form of a lookup table, and the correction brightness for the original brightness is predetermined.

All pixels of the image can be allowed to have the correction brightness in which the brightness correction is performed by repeating the steps represented by S820 through S840.

A step represented by S850 outputs an image in which the brightness correction is performed.

In accordance with another embodiment of the present invention, a recording medium tangibly embodying a program of instructions executable by a digital processing apparatus to correct the brightness of an image, the recording medium being readable by the digital processing apparatus, the program performing a brightness correction method of the steps represented by S810 through S850 is recorded.

The recording medium of the present invention refers to the medium such as CD-ROM, RAM, floppy disc, hard disc and magneto-optical disc capable of being read by a computer and storing a program.

As described above, in accordance with the present invention, an image brightness correction method and a method thereof and a recording medium a recoding medium recorded with a program performing the method can smooth the brightness of a whole image without amplifying a noise component of a surrounding part of the image.

The present invention smoothes a dynamic range of an image and acquires the contrast of the image.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

What is claimed is:

1. An apparatus correcting the brightness of an image by using a correction curve, the apparatus comprising:
   an image input unit, receiving an image;
   a correction gradient selection unit, selecting a gradient of the correction curve corresponding to an object pixel, having the brightness desired to be corrected, of pixels of the image;
   a correction performance unit, converting original brightness of the object pixel into correction brightness according to the correction curve having the selected gradient; and
   an image output unit outputting the image allowing the object pixel to have the correction brightness by the correction performance unit;
   whereas the correction curve increases the contrast of the corresponding correction brightness if the original brightness is the same as or smaller than a predetermined brightness, and the correction curve decreases the contrast of the corresponding correction brightness if the original brightness is larger than a predetermined brightness.

2. The apparatus of claim 1, wherein the correction gradient selection unit selects the gradient to increase the contrast of the corresponding brightness according to the position relationship between a center pixel of the image and the object pixel if the original brightness is the same as or smaller than the predetermined brightness.

3. The apparatus of claim 1, wherein the correction curve is the same as or larger than 1 if the original brightness is the same as or smaller than the predetermined brightness and is smaller than 1 if the original brightness is larger than the predetermined brightness.

4. The apparatus of claim 1, wherein the correction curve is represented in a form of a lookup table for the relationship between the original brightness and the correction brightness.

5. The apparatus of claim 1, wherein in the correction curve, the correction brightness is the same as or larger than a predetermined value.

6. The apparatus of claim 1, wherein the correction gradient selection unit allows the correction curve to have different gradients whenever the distance between the center pixel and the object pixel of the image is integer numbers times as many as predetermined pixel numbers.

7. A method correcting the brightness of an image by using a correction curve, the method comprising:
   (a) receiving an image;
   (b) selecting an object pixel, having the brightness desired to be corrected, of pixels of the image;
   (c) selecting a gradient of the correction curve corresponding to the object pixel;
   (d) converting original brightness of the object pixel into correction brightness according to the correction curve having the selected gradient; and
   (e) outputting the image allowing the object pixel to have the correction brightness,
   whereas the correction curve increases the contrast of the corresponding correction brightness if the original brightness is the same as or smaller than a predetermined brightness, and the correction curve decreases the contrast of the corresponding correction brightness if the original brightness is larger than a predetermined brightness.

8. The method of claim 7, wherein the step (c) selects the gradient to increase the contrast of the corresponding brightness according to the position relationship between a center pixel of the image and the object pixel if the original brightness is the same as or smaller than the predetermined brightness.

9. The method of claim 7, wherein the correction curve is the same as or larger than 1 if the original brightness is the same as or smaller than the predetermined brightness and is smaller than 1 if the original brightness is larger than the predetermined brightness.

10. The method of claim 7, further comprising repeating the steps (b) through (d) until all pixels of the image are selected as the object pixel before the step (e).

11. The method of claim 7, wherein the correction curve is represented in a form of a lookup table for the relationship between the original brightness and the correction brightness.

12. The method of claim 7, wherein in the correction curve, the correction brightness is the same as or larger than a predetermined value.

13. The method of claim 7, wherein the step (b) allows the correction curve to have different gradients whenever the distance between the center pixel and the object pixel of the image is integer numbers times as many as predetermined pixel numbers.

14. A non-transitory recording medium tangibly embodying a program of instructions executable by a digital processing apparatus to correct the brightness of an image, the recording medium being readable by the digital processing apparatus, the program executing the following steps:
   (a) receiving an image;
   (b) selecting an object pixel, having the brightness desired to be corrected, of pixels of the image;
   (c) selecting a gradient of the correction curve corresponding to the object pixel;
   (d) converting original brightness of the object pixel into correction brightness according to the correction curve having the selected gradient; and
   (e) outputting the image allowing the object pixel to have the correction brightness,
   whereas the correction curve increases the contrast of the corresponding correction brightness if the original brightness is the same as or smaller than a predetermined brightness, and the correction curve decreases the contrast of the corresponding correction brightness if the original brightness is larger than a predetermined brightness.

* * * * *